US008275274B2

(12) United States Patent
Takayama

(10) Patent No.: US 8,275,274 B2
(45) Date of Patent: Sep. 25, 2012

(54) IMAGE FORMING APPARATUS

(75) Inventor: Yoshinobu Takayama, Kawasaki (JP)

(73) Assignee: Ricoh Company, Ltd., Toyko (JP)

(*) Notice: Subject to any disclaimer, the term of this patent is extended or adjusted under 35 U.S.C. 154(b) by 1198 days.

(21) Appl. No.: 12/081,361

(22) Filed: Apr. 15, 2008

(65) Prior Publication Data

US 2008/0273886 A1 Nov. 6, 2008

(30) Foreign Application Priority Data

Apr. 23, 2007 (JP) ................................ 2007-112849

(51) Int. Cl.
*G03G 15/00* (2006.01)
*G06F 3/00* (2006.01)

(52) U.S. Cl. ............. 399/38; 399/42; 399/46; 358/1.15

(58) Field of Classification Search .................... 399/12, 399/38, 42, 44, 46, 47, 301, 302; 358/1.15
See application file for complete search history.

(56) References Cited

U.S. PATENT DOCUMENTS 6,774,951 B2 * 8/2004 Narushima .................. 348/552
6,975,818 B2 * 12/2005 Lee ................................ 399/75

FOREIGN PATENT DOCUMENTS

JP 2002-258691 9/2002
JP 2006-218682 8/2006

* cited by examiner

*Primary Examiner* — Walter L Lindsay, Jr.
*Assistant Examiner* — Jessica L Eley
(74) *Attorney, Agent, or Firm* — Harness, Dickey & Pierce

(57) ABSTRACT

Example embodiments reduce the number of data input/output lines by carrying on a single signal line input signals to the image forming control means from a plurality of detection means and drive signals output to a plurality of drive means from the image forming control means, provide versatility for coping with cases where configuration of the image forming apparatus is changed without increasing the number of signal lines, and control the drive means that require a drive pulse and simultaneous drive of a plurality of drive means. Identification control means determines whether a drive signal is output to drive means of a plurality of input/output means, or whether a detection signal from detection means is input, identifies any one input/output means of the plurality of input/output means from an identification signal, and specifies the data to be transferred to a data line as data of the identified input/output means.

8 Claims, 10 Drawing Sheets

IMAGE FORMING APPARATUS

BACKGROUND OF THE INVENTION

1. Field of the Invention

The present invention relates to an image forming apparatus such as a copier or printer of electrophotographic type or inkjet type, and in particular relates to reduction of the number of data signal lines.

2. Description of the Related Art

In for example a copier of the electrophotographic type, there may be provided various types of units that are capable of being detached from the main body of the apparatus and replaced. Various types of detection means are provided that detect the attached/detached state of these various replaceable units with respect to the main body of the apparatus and output a detection signal indicating this state. In addition, various types of actuators such as motors, solenoids or clutches are provided in the main body of the apparatus and these actuators are driven by means of drive means that are supplied with control signals from control means.

On the other hand, in addition to adaptation to color use, improved performance and multi-functionality are sought in the image forming apparatuses of recent years. This necessitates a large number of signal lines for transmission of for example detection signals from the various types of detection means, drive signals to the various types of actuators, and control signals from the control means, and the number of signal lines has tended to increase. Also, the various types of units, various types of detection means and actuators require power supply, so power supply lines and so forth are also necessary.

Consequently, due to the input and output to the control means of such a large number of signals through signal lines, the control means tends to become bulky. Furthermore, since the control means is installed in a location that is remote from the various types of units and various types of detection means, and a large number of signal lines are arranged running round the interior of the main body of the apparatus, these present a considerable obstacle to simplification, miniaturization and cost reduction of the apparatus.

In order to avoid such a large number of signal lines, in the image forming apparatus disclosed in Japanese Patent Application Laid-open No. 2002-258691, the signal lines that connect the image forming control means and the various units may be reduced in number by adopting an arrangement in which the various units are provided with an I/O expander and by the image forming control means identifying the various types of units according to the state of an input port of the I/O expander.

Also, in the image forming apparatus disclosed in Japanese Patent Application Laid-open No. 2006-218682, transfer data that is set when the transfer clock is at L level and loaded on the rise of the transfer clock is converted to image serial data and the rising edge signal of the transfer data when the transfer clock becomes H level is used as a control signal so that the image serial data and the control signal can be transferred by a common signal line.

With the image forming control means, when forming an image, it is necessary to carry out fine control of the drive means and actuators within the apparatus in accordance with the conditions at many locations in the apparatus and the operating state. In order to achieve such fine control of the drive means and actuators, even if the signal lines connecting the image forming control means and the various units are reduced in number by identifying the type of unit in accordance with the state of an input port of an I/O expander of the various units as disclosed in Japanese Patent Application Laid-open No. 2002-258691, or, as disclosed in Japanese Patent Application Laid-open No. 2006-218682, the image serial data and control signals are transferred by a common signal line, the number of signal lines that are input to the image forming control means and the number of signal lines that are output therefrom become enormous, resulting in complexity of the apparatus and making it difficult to miniaturize.

Also, when the system configuration of the image forming apparatus i.e. the number of input/output means thereof is altered, appropriate remodeling of the image forming control means (circuit board) and/or additional provision of connectors and so forth is necessary, resulting in increased costs.

SUMMARY OF THE INVENTION

It is an object of the present invention to provide an image forming apparatus in which the enormous number of data input/output lines is reduced by carrying on a single signal line the signals that are input to the image forming control means from a plurality of detection means and the drive signals that are output to a plurality of drive means from the image forming control means, versatility is provided so as to be able to cope with the cases where the configuration of the image forming apparatus is changed without increasing the number of the signal lines, and control of the drive means that require a drive pulse and simultaneous drive of a plurality of drive means can be realized.

In an aspect of the present invention, an image forming apparatus comprises an image forming control device for controlling an operation of the apparatus as a whole; a plurality of input/output device with respect to the image forming control device, comprising a plurality of detection device for detecting various conditions within the apparatus and a plurality of drive device for driving a plurality of actuators such as motors or solenoids; and an identification control device arranged in the vicinity of the plurality of input/output device and connected to the image forming control device by a single data line, an identification signal line, and a period signal line. The data line individually transfers data of an input signal and a drive signal with respect to the plurality of input/output device, and the period signal line transfers a period signal that specifies an input/output determination period that determines input/output of data with respect to the plurality of input/output device, an identification validity period in which an identification signal that is output on the identification signal line is valid, and a data validity period in which data of the data line is valid. The identification control device determines whether a drive signal is output to the drive device of the plurality of input/output device in the input/output determination period of the period signal transferred to the period signal line, or whether a detection signal from the detection device is input, identifies any one input/output device of the plurality of the input/output device from the identification signal transferred to the identification signal line in the identification validity period of the period signal, and specifies the data to be transferred to the data line in the data validity period of the period signal as the data of the identified input/output device. The identification control device comprises a drive pulse generating section that generates a drive pulse of the identified input/output device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Before describing the present invention, prior art relating to the present invention and problems thereof will be described with reference to the drawings.

Figure 1:
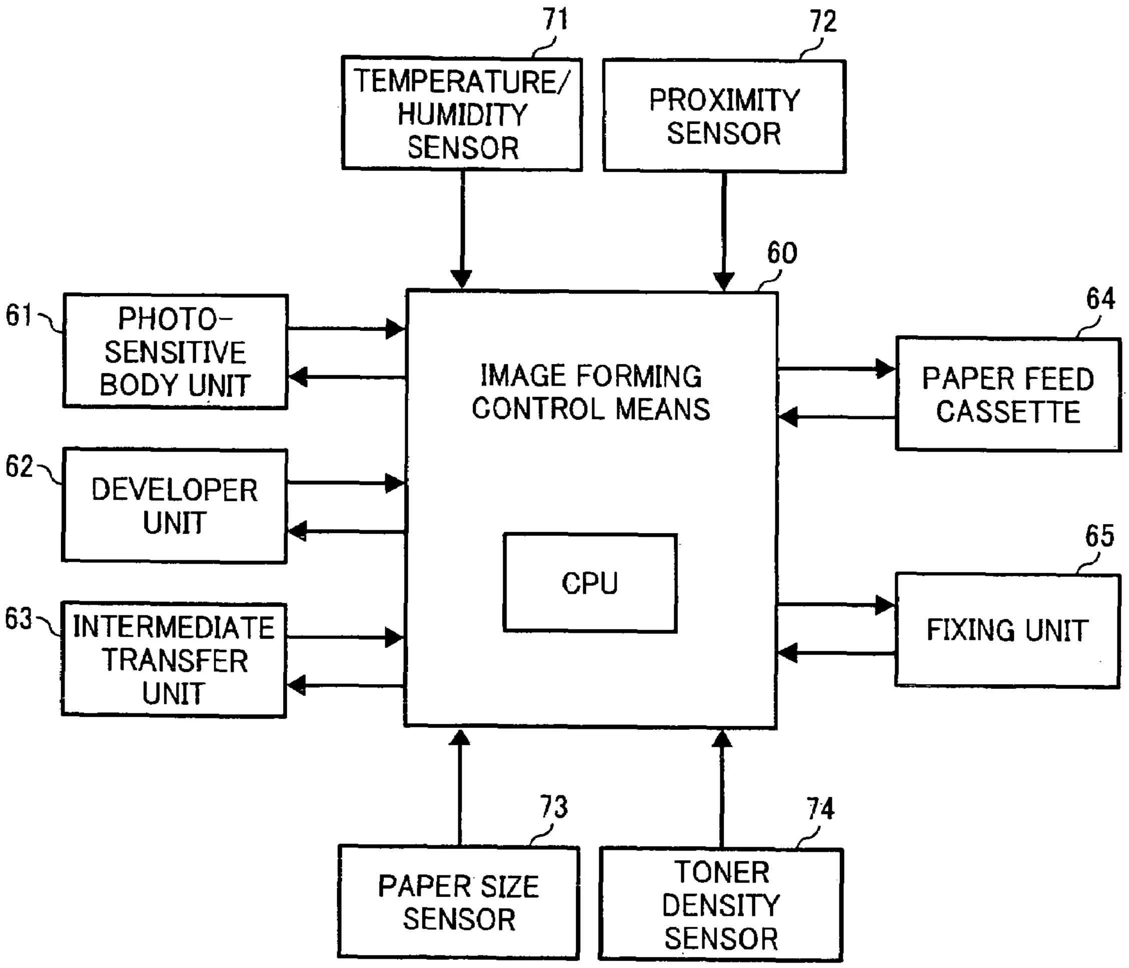
FIG. 1 is a block diagram showing the configuration of a prior art image forming apparatus.

FIG. 1 shows the configuration of a prior art image forming apparatus.

As shown in the figure, this image forming apparatus comprises various units that are capable of being detached from the main body of the apparatus and replaced, such as for example a photosensitive body unit 61 that forms an electrostatic latent image on a photosensitive body; a developing unit 62 whereby the electrostatic latent image formed on the photosensitive body is developed so as to be rendered visible, an intermediate transfer unit 63 whereby images that have been rendered visible in various colors are superimposed, a paper supply cassette 64 that accommodates and delivers recording paper onto which the image is to be transferred, and a fixing unit 65 that fixes the image transferred onto recording paper. These units are driven and controlled by image forming control means 60 comprising a CPU, provided in the main body of the image forming apparatus.

Input signals from detection means that are provided in the various units constitute signals indicating the attached/detached state of the various replaceable units with respect to the main body of the apparatus and these input signals are input to image forming control means 60. Other input signals to the image forming control means 60 include detection signals from various types of detection means such as a temperature/humidity sensor 71 for detecting temperature/humidity within the apparatus, a proximity sensor 72 for detecting position/condition information of for example a contacting/separating mechanism that is driven during image formation and position/condition information of the recording medium, a paper size sensor 73 and a toner density sensor 74. The signal lines of for example this paper size sensor 73 or paper feed cassette sensor at the mounting location of the paper feed cassette 64 comprise a plurality of bits and the number of signal lines is thereby greatly increased. Also, there is for example a feedback signal from the high-voltage power source.

Also, a plurality of actuators such as motors or solenoids or clutches are provided for the various units; drive signals (data signals) are output as output signals from the image forming control means 60 to drive means for driving these.

Thus, in a prior art image forming apparatus, a large number of signal lines crawl through the interior of the apparatus, presenting a considerable obstacle to simplification/miniaturization and cost reduction of the apparatus.

A detailed description of the present invention is given below with reference to the drawings.

Figure 2:
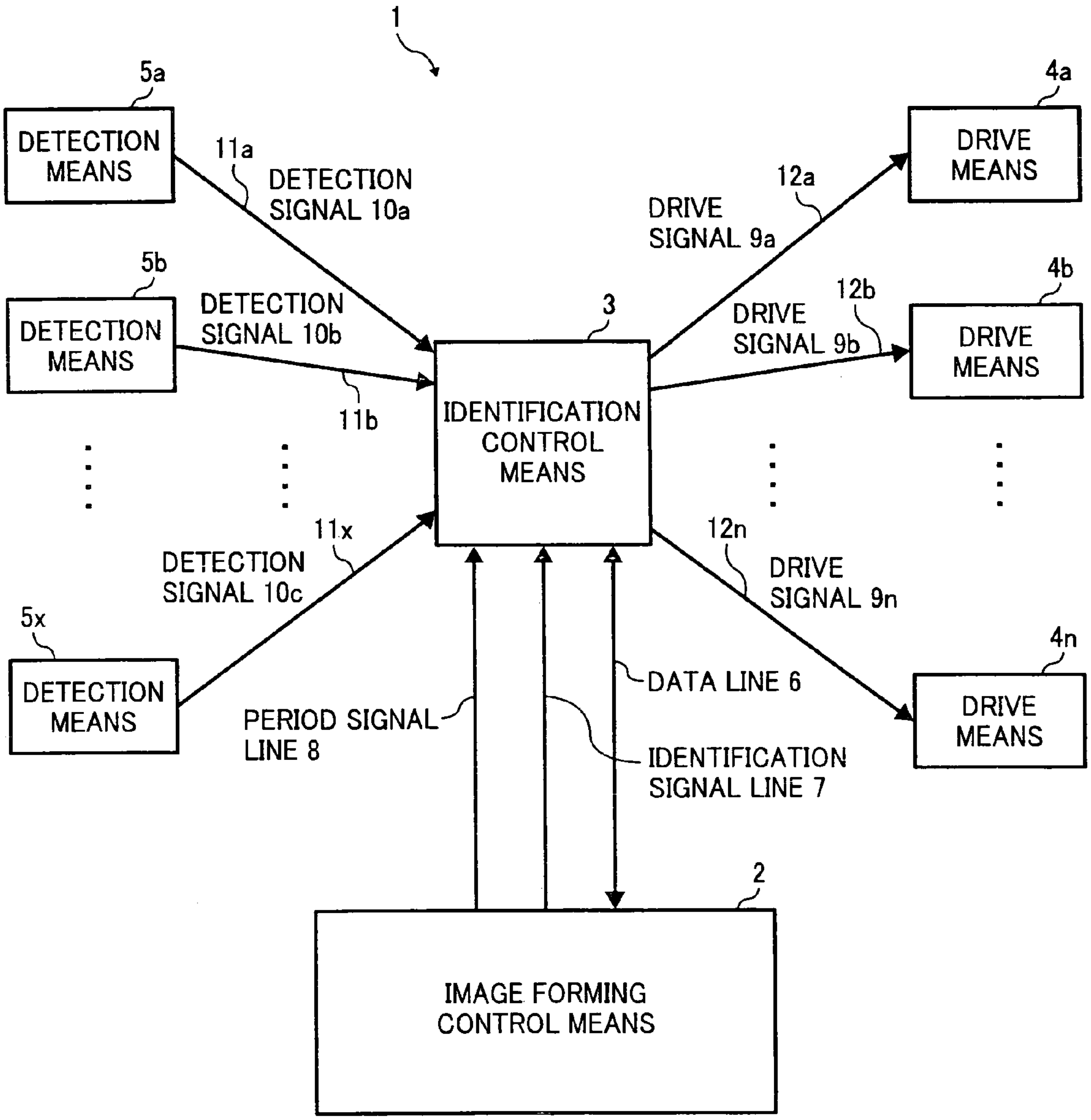
FIG. 2 is a block diagram showing the configuration of an image forming apparatus according to an embodiment of the present invention.

FIG. 2 shows the configuration of an image forming apparatus according to an embodiment of the present invention. As shown in FIG. 2, the image forming apparatus 1 comprises image forming control means 2 that controls the operation of the apparatus as a whole, identification control means 3, a plurality of drive means 4*a* to 4*n* constituting input/output means, and a plurality of detection means 5*a* to 5*x*. The drive means 4*a* to 4*n* are provided in order to drive the actuators in the various types of units such as the photosensitive body unit or developing unit, intermediate transfer unit or fixing unit, that form the image in for example an electrostatic system. The detection means 5a to 5*x* detect various types of condition of the apparatus such as the attached/detached state or operating state of the various types of units.

Figure 3:
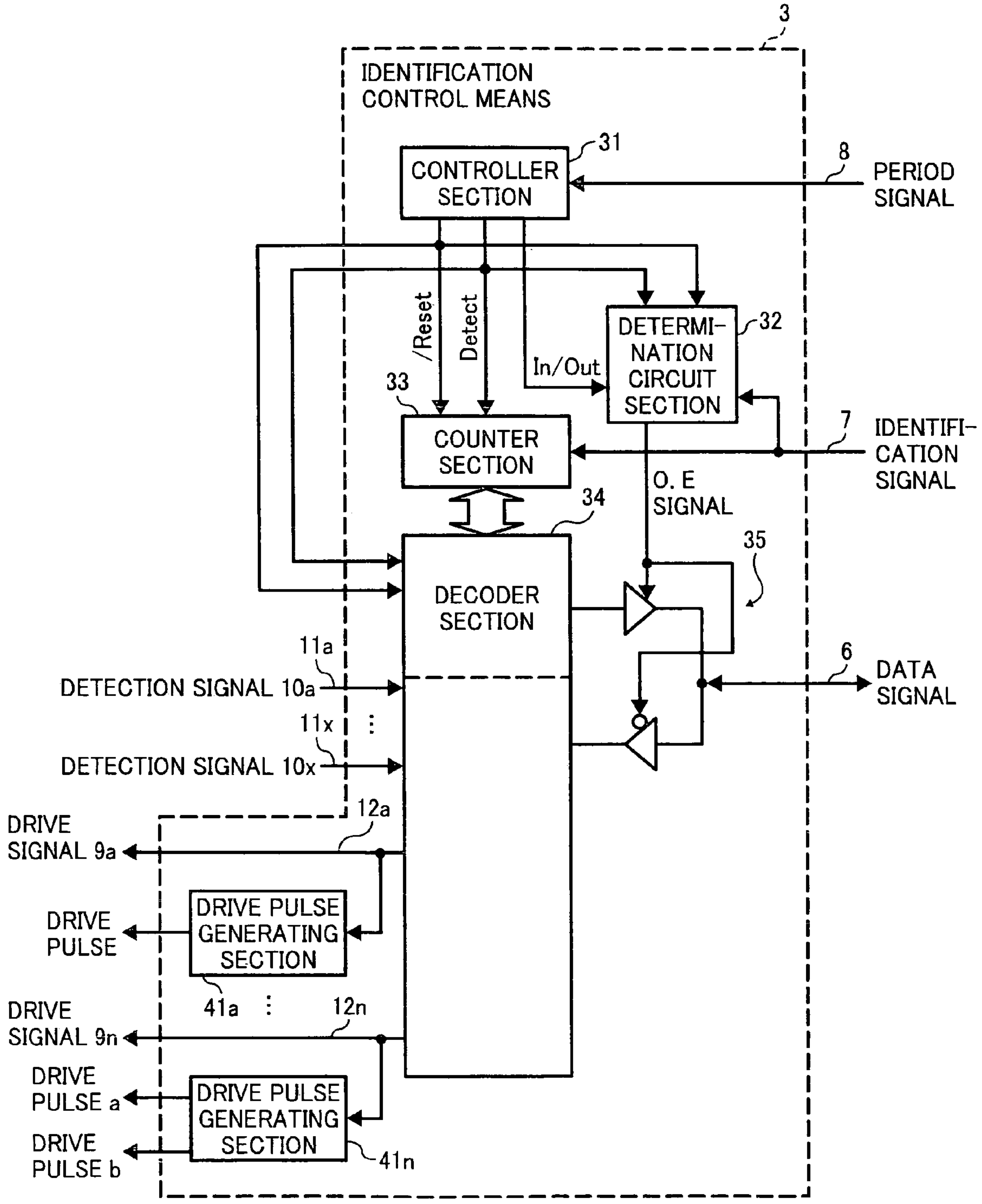
FIG. 3 is a block diagram showing the configuration of identification control means of this image forming apparatus.

Also, identification control means 3 is provided in the vicinity of the plurality of drive means 4*a* to 4*n* and detection means 5*a* to 5*x*, and is connected by a single data line 6, identification signal line 7 and period signal line 8 with the image forming control means 2. As shown in FIG. 3, this identification control means 3 comprises a controller section 31, decision circuit section 32, counter section 33, decoder section 34 and data input/output section 35. Any one of the drive means 4*a* to 4*n* can be identified by the identification signal 7 that is output to the identification signal line 7 from the image forming control means 2 and the period signal that is output to the period signal line 8; the data signal that is output on the data line 6 from the image forming control means 2 to the thus-identified drive means 4 is then output as a drive signal 9 thereto; also, the binary data that is output from the detection means 5*a* to 5*x* or the multi-bit serial data detection signals 10*a* to 10*x* is input, being identified for each of the detection means 5*a* to 5*x* by the identification signal that is output to the identification signal line 7 from the image forming control means 2 and the period signal that is output on the period signal line 8, and is output to the image forming control means 2 through the data line 6.

Figure 4:
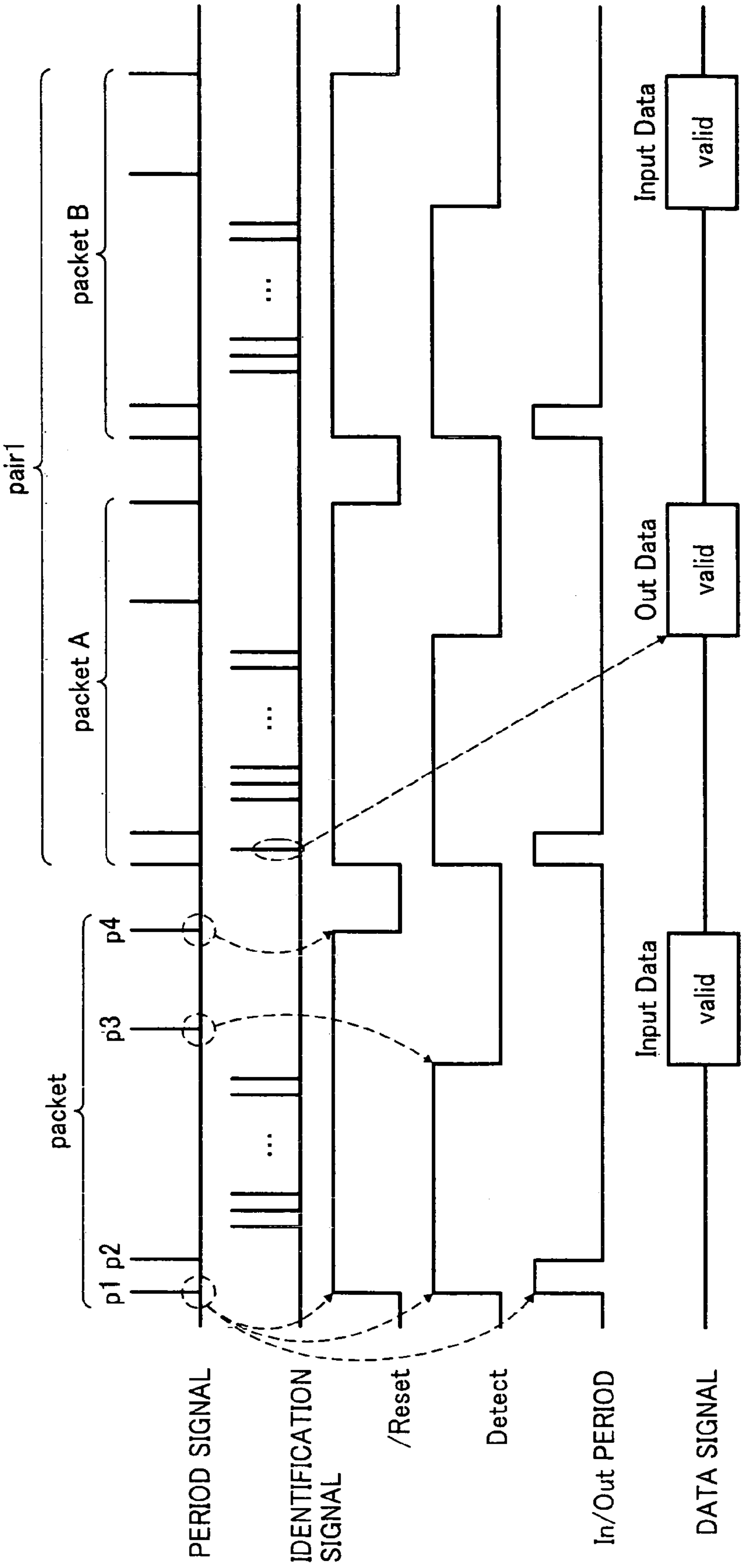
FIG. 4 is a time chart showing the signal control timing with which processing is effected by this identification control means.

In addition, pulses p1 to p4 are output as period signals as shown by the time chart of FIG. 4 from the image forming control means 2 to the period signal line 8 and are input to the controller section 31 identification control means 3. The period between pulses p1 and p2 of this period signal is the input/output determination period, in which output of data to indicate whether a drive signal is to be output to the drive means 4 or the detection signal of the detection means 5 is to be input is identified; in addition, the period between the pulses p2 to p3 is an identification validity period that validates the identification signal that is output to the identification signal line 7 for identifying the drive means 4*a* to 4*n* and detection means 5*a* to 5*x*; and the period between the pulses p3 to p4 is a data validation period for the data line 6. Also, the identification pulse is output as an identification signal to the identification signal line 7 and is input to the decision circuit section 32 and counter section 33 of the identification control means 3. The drive means 4*a* to 4*n* and detection means 5*a* to 5*x* are identified by counting the number of these identification pulses. For example, if the number of identification pulses is n, either the drive means 4*n* or detection means 5*n* is identified: which of the drive means 4*n* or detection means 5*n* is in question is identified according to the determination result of the input/output determination period. By thus providing an input/output determination period in the period signal immediately prior to the identification validation period, the identification pulse number of the identification signal can be shared by the detection means 5 and drive means 4, thereby making it possible to shorten the identification validation period by reducing the number of identification pulses of the identification signal, and so making it possible to reduce the scale of the counter that counts these identification pulses.

The group of the series of signals comprising the period signal, identification signal and data signal generated during this period signal p1 to p4 will be termed a packet. Also, identification control of the input/output means can be efficiently performed by using the same identification pulse number for the pair of drive means 4 and detection means 5 that is desired to be employed. Specifically, as shown in FIG. 4, the result of change of drive by the drive means 4 can be confirmed without needing to change the number of identification pulses of the identification signal, by identification and driving of the paired drive means 4 by the leading packet A and identification and detection of the detection means 5 by the subsequent packet B. For example, it is possible to drive the contacting/separating mechanism by driving for example a solenoid or motor by the drive means 4 and to confirm immediately after such driving whether the drive was correct, by finding the consequent detection result of the detection means 5 provided in the contacting/separating mechanism section.

Figure 5:
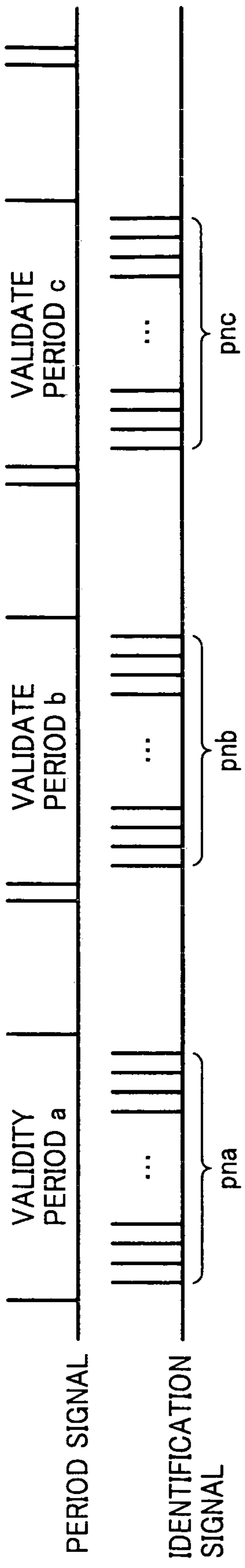
FIG. 5 is a timing chart showing the identification pulse of the identification signal whereby the input/output means is identified.

An example of identifying a drive means 4 or detection means 5 will now be described with reference to FIG. 5. The identification control means 3 identifies the relevant input/output means from among the drive means 4*a* to 4*n* or detection means 5*a* to 5*x*, by counting the pulse number pn of the identification signal that is generated in the period of validity of the identification signal. For example, the identification control means 3 or associates the pulse number of the identification signal beforehand with the drive means 4 and detection means 5 such that, if the pulse number of the identification signal in the period a of validity of the identification signal is pna, the drive means 4*a* or detection means 5*a* is identified and selected and, if the pulse number of the identification signal in the period b of validity of the identification signal is pnb, the drive means 4*b* or detection means 5*b* is identified and selected.

Also, the controller section 31 of the identification control means 3 inputs the pulses p1 to p4 of the period signal that are output from the image forming control means 2 on the period signal line 8 and, as shown in FIG. 4, generates a /Reset signal and Detect signal and input/output period signal, which it outputs to the decision circuit section 32 and outputs the /Reset signal and Detect signal to the counter section 33. The decision circuit 32 controls the input/output of data by generating an output enable signal (O. E. signal) that validates the data on the data line 6 in accordance with the condition of the identification signal line 7 in the input/output period. Then, if a drive pulse is generated on the identification signal line 7 in the input/output period of the paired leading packet A, the input/output means that is recognized becomes the drive means 4, so the data that is output on the data line 6 from the image forming control means 2 is output as drive data for this drive means 4 that is thus recognized. Also, if no drive pulse is generated on the identification signal line 7 in the input/output period of the subsequent packet B, the input/output means that is recognized becomes the detection means 5, and the data on the data line 6 during the data validity period is input to the image forming control means 2 as the detection signal.

In addition, the counter section 33 counts the number of identification pulses constituting the identification data on the identification signal line 7 in the period of validity of the identification signal determined by the /Reset signal and Detect signal generated by the controller section 31, and outputs the count value that is thus obtained to the decoder section 34. The decoder section 34 is respectively connected with the detection means 5*a* to 5*x* and the data lines 11*a* to 11*x* and is respectively connected with the drive means 4*a* to 4*n* and the data lines 12*a* to 12*n*, and identifies and selects a single drive means 4 and detection means 5 in accordance with the count value that is input thereto; it then outputs the data that was input from the data line 6 in the data validity period to the identified and selected drive means 4 through the data line 12 as the drive signal 9, and, under the control of the O. E. signal, outputs the data 10 that is output from the identified and selected detection means 5 through the data line 11 onto the data line 6. Also, as shown in FIG. 3, drive pulse generating sections 41*a* to 41*n* are respectively provided corresponding to the drive means and the drive pulse generating sections 41*a* to 41*n* generate pre-set drive pulses corresponding to the drive means. When the determination circuit section 32 determines output, the decoder section 34 outputs the data of the data line 6 as a drive signal to the corresponding drive means, in accordance with the count value. In the case of for example a solenoid or clutch, the corresponding drive means then outputs the data directly as a drive signal or, in the case of other drive means, that requires a drive pulse, such as a motor, outputs this together with a pre-set drive pulse generated by the drive pulse generating section. For example, pre-set drive pulses are generated such as a DC motor drive pulse, in the case of the drive pulse generating section 41*a*, or another DC motor drive pulse, in the case of the drive pulse generating section 41*b*, or two-phase drive pulses a, b for a stepping motor, in the case of the drive pulse generating section 41*n*.

Figure 6:
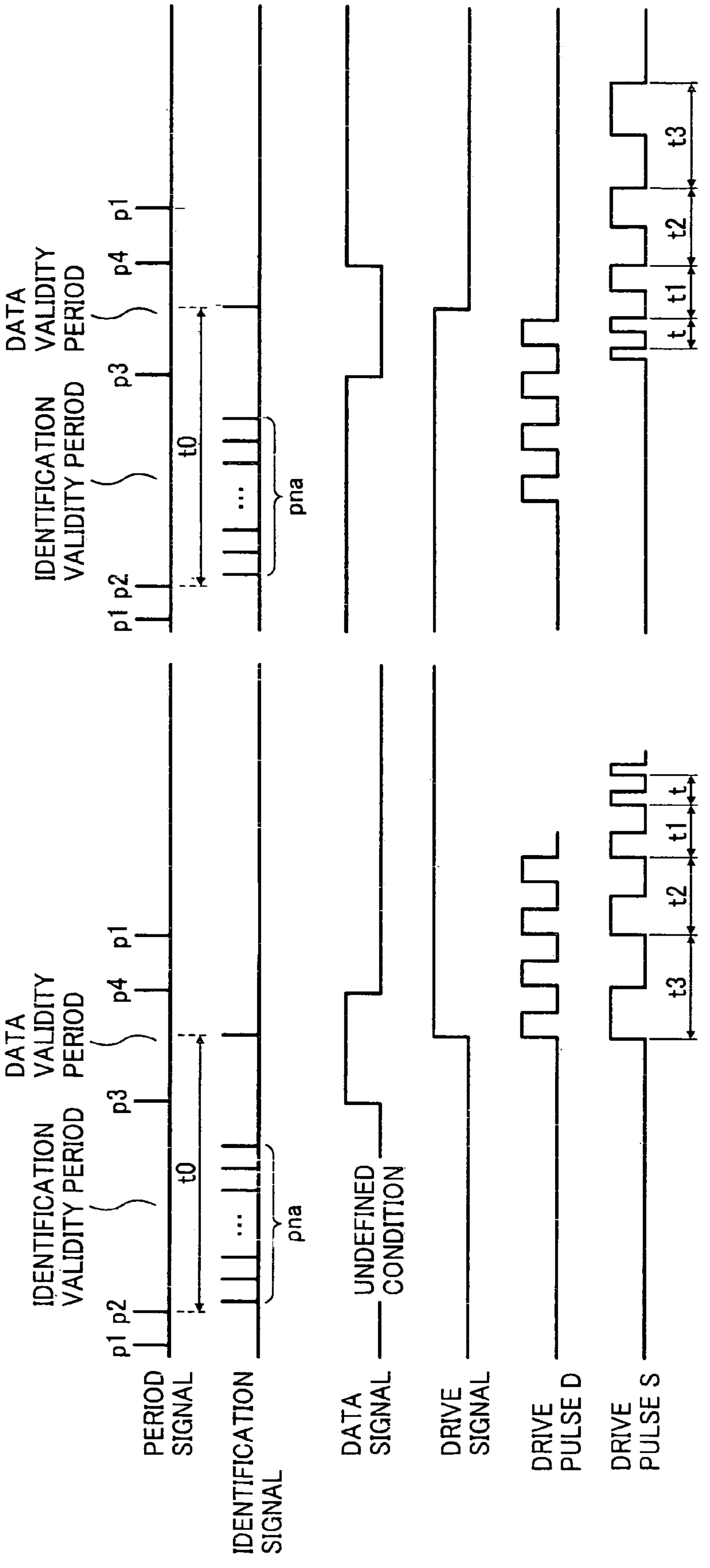
FIG. 6 is a time chart showing the timing with which the data of the drive signal is validated.

The timing of validation of the data of the drive signals 9*a* to 9*n* that is output through the data lines 12*a* to 12*n* to these drive means 4*a* to 4*n* is shown in FIG. 6. The data on the data line 6 becomes valid on the rising edge of the pulse p3 of the period signal. In cases where precision of the drive timing is not required, the data on the data line 6 may be output to the corresponding drive means 4 by being input with a fixed timing between the pulses p3 to p4 constituting the period of validity of the data. However, in cases where strictness of drive timing is required, a latch pulse is transmitted with a desired timing t0 to the identification signal line 7 between the pulses p3 to p4 constituting the period of validity of the drive data, and the data on this pulse data line 6 is then output to the corresponding drive means 4. In this way, the drive timing can be finely adjusted. For example, if a DC motor starts to be driven or a solenoid is turned on when the drive signal is "H", a pulse is delivered to the identification signal line 7 with a desired timing by making the data on the data line 6 "H" in this period of validity. Then, when drive of the DC motor is to be stopped or the solenoid is to be turned off, a latch pulse is generated with a desired timing as described above by making the data in the data validity period "L". Also, when the drive means that is the subject of identification is a single phase DC motor and this is driven with a drive signal "H" as in the example described above, a fixed period drive pulse D is generated and output by the drive pulse generating section in response to the latch pulse. In the case where the drive means that is the subject of identification is a single phase stepping motor, drive pulses of different periods t3>t2>t1 are continuously generated and output as shown in FIG. 6 in order to achieve a slowing up, in order to ensure that synchronization of generation/stoppage of the drive pulse S with the timing of the aforementioned latch pulse is not lost. In cases where the motor is stopped when the data in the data validity period is "L", slowdown is commenced with the timing of the latch pulse before stopping the drive pulse.

Figure 7:
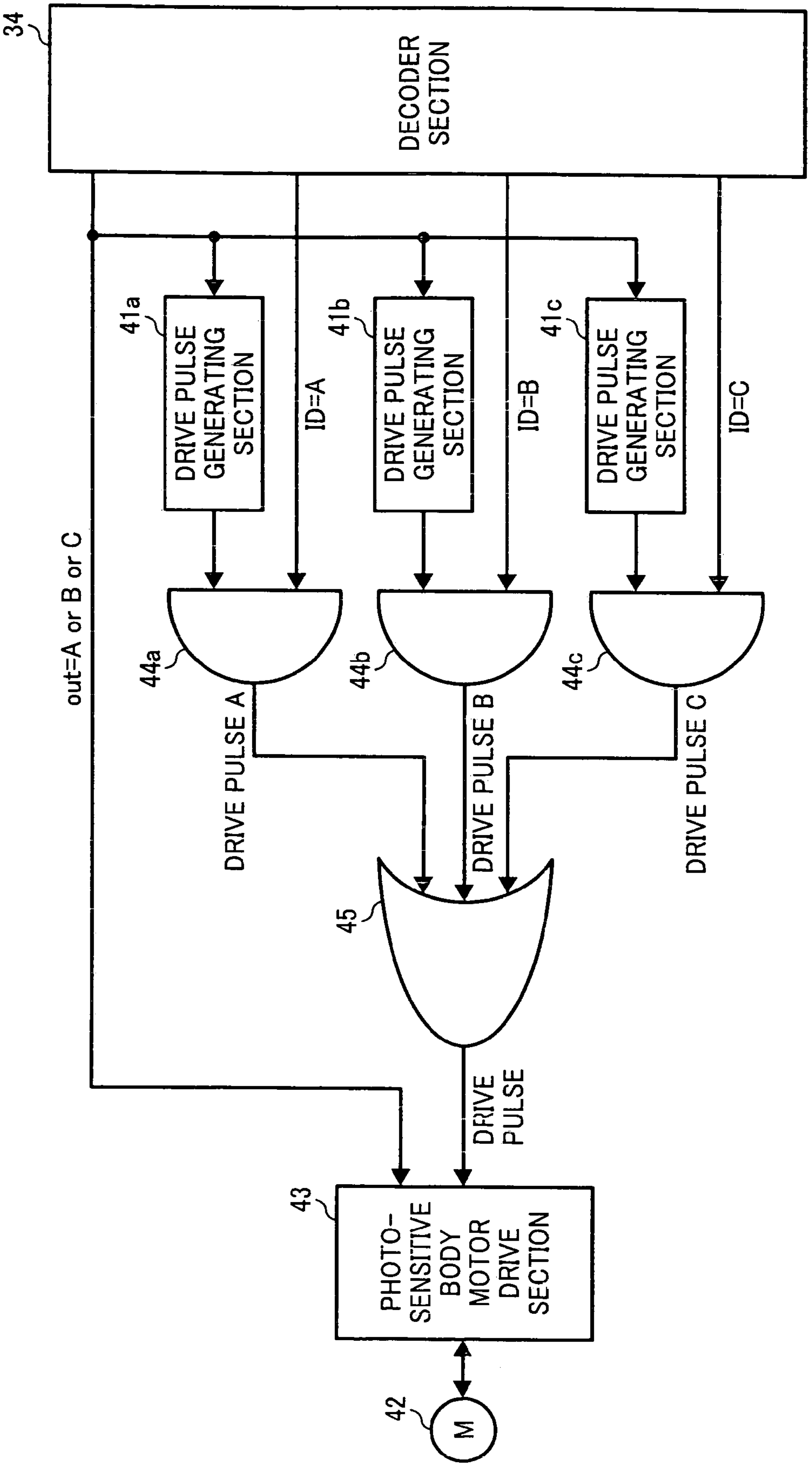
FIG. 7 is a circuit diagram showing the logic circuitry that generates different drive pulses with allocation of a plurality of identification numbers with respect to a single drive means.

Also, as shown in FIG. 7, an example of this is constituted by drive means that generates different drive pulses with respective different identification numbers, where more than one identification number (ID) is allocated to a single drive means, such as for example the drive pulse of the drive motor 42 of for example the photosensitive body or intermediate transfer belt, that requires the ability to change rotational speed in accordance with the write density. In this case, the drive pulse A and identification number A that are generated by the drive pulse generating section 41*a* in response to drive signals A, B or C from the decoder section 34 are supplied to an AND gate 44*a* and the output of the AND gate 44*a* is supplied to an OR gate 45. Also, the drive pulse B and identification number B that are generated by the drive pulse generating section 41*b* in response to drive signals A, B or C from the decoder section 34 are supplied to an AND gate 44*b* and the output of the AND gate 44*b* is supplied to the OR gate 45. In addition, the drive pulse C and identification number C that are generated by the drive pulse generating section 41*c* in response to drive signals A, B or C from the decoder section 34 are supplied to an AND gate 44*c* and the output of the AND gate 44*c* is supplied to the OR gate 45. The drive pulses A, B or C that are output from the OR gate 45 are then supplied to the photosensitive body motor drive section 43. For example, when the identification number A from the decoder section 34 is supplied to the AND gate 44*a*, the AND gate 44*a* supplies to the OR gate 45 the drive pulse A that is generated by the drive pulse generating section 41*a*, and, if no identification number B or identification number C is output from the decoder section 34, the drive pulse A from the OR gate 45 is supplied to the photosensor body and motor drive section 43 and the photosensitive body motor drive section 43 outputs a drive pulse A of frequency fA to the drive motor 42. In this way, identification numbers A, B, C are conferred on the photosensitive body motor drive section 43 of the photosensitive body drive motor 42, so that, in the case of the identification number A, drive pulses A of frequency fA are output to the photosensitive body motor drive means 43, and, in the case of the identification number B, drive pulses B of frequency fB are output to the photosensitive body motor drive means 43, and, in the case of the identification number C, drive pulses C of frequency fC are output to the photosensitive body motor drive means 43.

Figure 8:
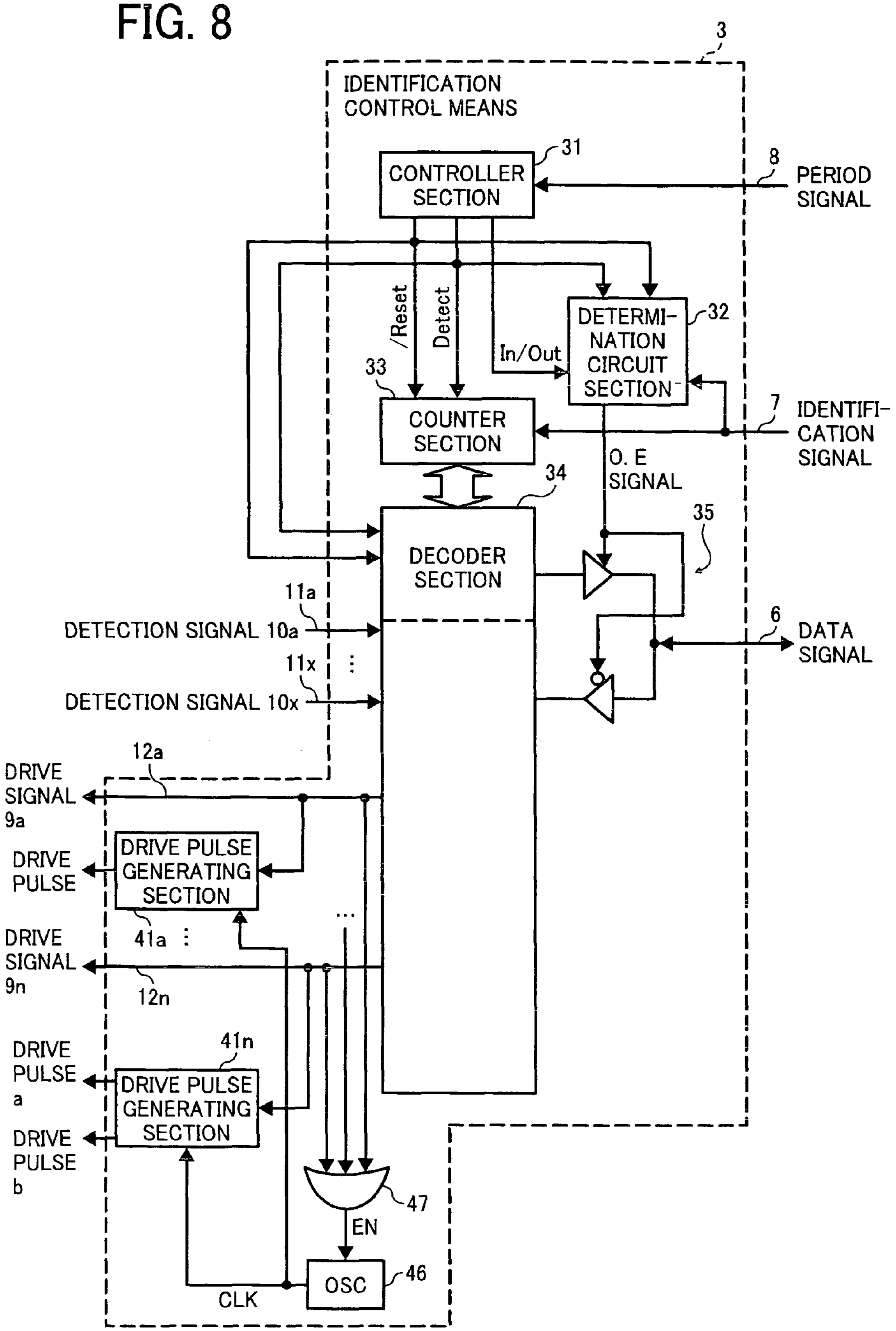
FIG. 8 is a block diagram showing another configuration of identification control means in the image forming apparatus according to the present invention.

FIG. 8 shows another configuration of the identification control means in an image forming apparatus according to the present invention. In FIG. 8, the same reference symbols as in FIG. 3 indicate the same constituent elements. The identification control means 3 shown in FIG. 8 comprises a signal oscillator (OSC) 46 and OR gate 47. When, of the plurality of drive means connected with the identification control means 3, even one of the drive means that requires a drive pulse is in the drive condition, the EN signal that is supplied to the signal oscillator 46 from the OR gate 47 becomes valid and the signal oscillator 46 is operated. Consequently, the signal oscillator 46 is operated at the time point where this is selected by the identification number and drive pulse generation becomes necessary. That is, the "H" condition is maintained until the drive signals 9*a* to 9*n* of the drive means are identified for stopping drive. However, depending on the drive means, in some cases the drive signal may be "L". Also, when all of the drive means that are connected with the identification control means have received a stoppage request i.e. if all of the drive signals 9*a* to 9*n* are "L", the signal oscillator 46 is stopped and supply of the clock (CLK) to the drive pulse generating section is stopped.

In the case of the identification control method as described above, the drive means that are the subject of control are individually allocated identification numbers (ID), so that only a single drive means is arranged to be identified in the identification period: consequently, more than one drive means cannot be driven at the same time. Accordingly, in order to make it possible to drive more than one drive means at the same time, a plurality of pulses may be generated on the identification signal line in the input/output determination period. Specifically, variable control is performed of the number of drive means that can be simultaneously driven by employing the number of pulses on the identification signal line in the input determination period, so that, if the number of pulses on the identification signal line in the input determination period is one, the number of drive means that are the subject of identification as described above is one; if the number of pulses on the identification signal line in the input determination period is two, the number of drive means that are the subject of identification is two; and if the number of pulses on the identification signal line in the input determination period is three, the number of drive means that are the subject of identification is three.

Figure 9:
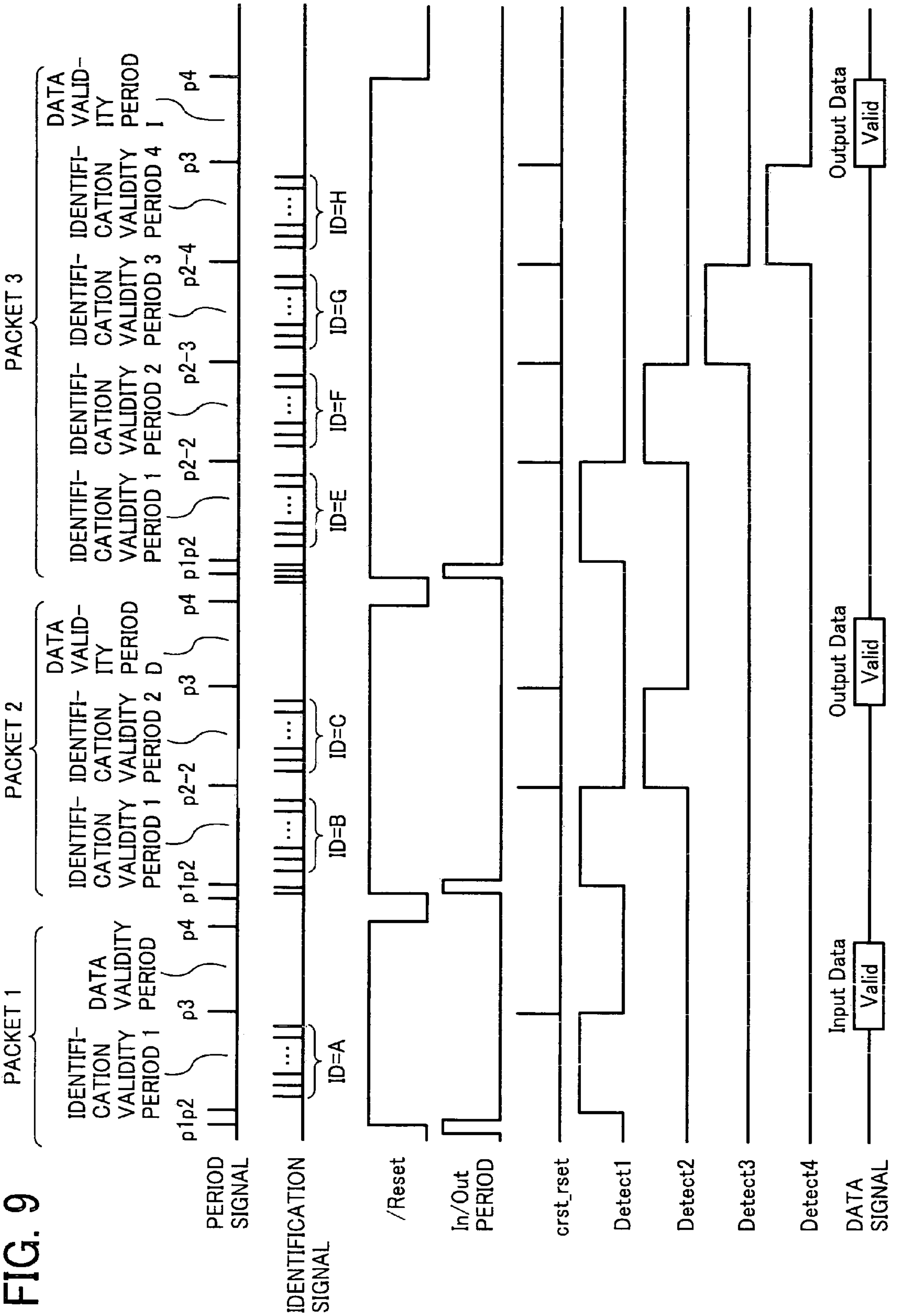
FIG. 9 is a time chart showing an example of the signal waveform of a signal line in FIG. 8.

FIG. 9 shows an example of the signal waveform on the signal line. This shows the control timing whereby, on identification of a packet 1 by the detection means, the presence of more than one drive means that are simultaneously driven by packet 2 and packet 3 is identified. The number of identification validity periods of the identification signal changes in accordance with the number of pulses of the identification signal line in the input determination period. The case where there are two simultaneously driven drive means is indicated by packet 2 and the case where there are four simultaneously driven drive means is indicated by packet 3. The numbers of pulses (crst_rset) of the identification signal in the input/output specified period are then respectively 2 and 4. The drive means whose identification numbers (ID) are B and C are successively identified by packet 2 and are simultaneously driven (or stopped) in the data validity period D; on the next packet, the drive means whose identification numbers are E, F, G and H are successively identified and are simultaneously driven (or stopped) in the data validity period I.

Figure 10:
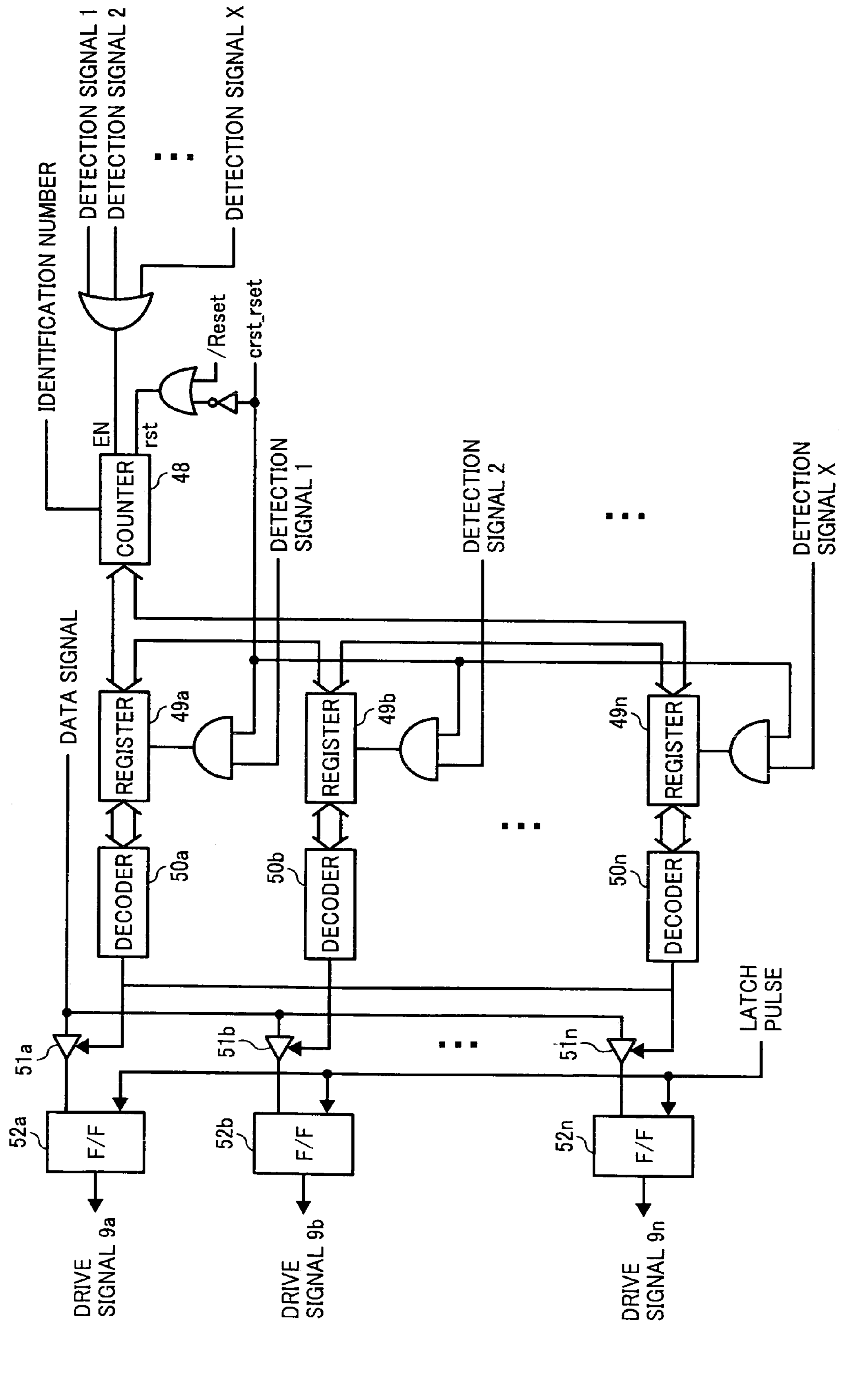
FIG. 10 is a circuit diagram showing an example of a functional block of a decoding connection section of the identification control means.

Next, an example of the functional block of the decoding connection portion of the identification control means is shown in FIG. 10. In FIG. 10, the same number of decoders and registers, that hold the count value (identification number (ID)) of the identification signal and whereby the identification number (ID) is set in the decoders, are provided as the number of drive means capable of being simultaneously driven. The counter 48 is reset on termination of each packet (signal: /Reset), and on termination of the identification validity period (signal: crst_rset). The counter 48 counts the identification signal pulses in the identification validity period (signal: detection signal), and sequentially outputs the count value to the registers 49*a* to 49*n* that are activated in the identification validity period. The activated registers 49*a* to 49*n* hold the count value on the signal: crst_rset until the next activation, and output this value to the decoders 50*a* to 50*n*.

The decoders 50*a* to 50*n* control the buffers 51*a* to 51*n* of the drive signal lines so as to enable output of the drive signal to the drive means having an identification number (ID) coinciding with the count value. The drive data obtained through the buffers 51*a* to 51*n* is confirmed by a latch pulse in the data validity period and is thus output to the drive means. It should be noted that, where the combination of drive means that can be simultaneously driven is known beforehand, the method can also be employed of identifying and driving these by the provision of a new identification number (ID) with respect to the combination. If this is done, identification numbers (ID) are provided for all the drive means combinations.

As described hereinabove, in the present embodiment, the identification control means comprises a drive pulse generating section that generates a drive pulse for the identified input/output means. In this way, control of the drive means in the input/output means in accordance with the input/output means and simultaneous drive of the drive means in the plurality of input/output means can be achieved.

As described above, the following benefits are obtained with the present invention:

(1) An image forming apparatus can be provided, in which the number of data input/output lines is reduced, versatility is provided so as to be able to cope with the cases where the configuration of the image forming apparatus is changed without increasing the number of the signal lines, and control of the drive means in the input/output means that require a drive pulse and simultaneous drive of a plurality of drive means can be realized.

(2) No separate control signal is required for generating a drive pulse for drive means in the input/output means.

(3) A plurality of drive frequencies of the drive means in the input/output means can be controlled with a simple configuration.

(4) Power consumption of the identification control means can be saved.

(5) The drive means in more than one input/output means can be simultaneously driven without increasing the number of control signals.

(6) The drive means in an arbitrary plurality of input/output means can be simultaneously driven by straightforward control.

Various modifications will become possible for those skilled in the art after receiving the teachings of the present disclosure without departing from the scope thereof.

The present application is based on and claims the benefit of priority of Japanese Patent Application No. 2007-112849, filed on Apr. 23, 2007, the entire contents of which are hereby incorporated herein by reference.

What is claimed is:

1. An image forming apparatus comprising:

an image forming controller configured to control an operation of the image forming apparatus;

a plurality of input and output lines, electrically connected to a plurality of detectors and a plurality of drivers, the plurality of detectors configured to detect various conditions within the apparatus and the plurality of drivers configured to drive a plurality of actuators; and an identification controller connected to the image forming controller by a single data line configured to transfer a data signal from and to a selected at least one of the plurality of input and output lines, identification signal line transferring an identification signal, and period signal line configured to transfer a period signal, the period signal configured to specify an input and output determination period during which the data signal is transferred from and to the selected at least one of the plurality of input and output lines and an identification validity period during which the identification signal is valid, wherein the identification controller is configured to determine whether to output a drive signal to at least one of the plurality of drivers and whether to read a detection signal from at least one of the plurality of detectors, identify the selected at least one of the plurality of input and output lines using the identification signal, and specify the data to be transferred to the data line in the data validity period of the period signal as the data of the identified input and output lines, and wherein the identification controller comprises a drive pulse generating section that generates a drive pulse of the identified input and output lines.

2. The image forming apparatus according to claim 1, wherein the drive pulse generated by the drive pulse generating section is set in accordance with the identified input and output lines.

3. The image forming apparatus according to claim 1, wherein a plurality of identification numbers are allocated to the plurality of input and output lines, and a plurality of drive pulses of different frequencies are set in the drive pulse generating section with respect to each of the identification numbers.

4. The image forming apparatus according to claim 1, wherein the identification controller comprises a signal oscillator, the input and output lines that required a drive pulse are identified, and the signal oscillator is driven or stopped in accordance with a drive or stop instruction of the identified input and output lines.

5. The image forming apparatus according to claim 1, wherein the identification controller changes a number of input and output lines that are capable of being driven simultaneously according to the identification signal.

6. The image forming apparatus according to claim 5, wherein the identification validity period is used to identify the number of the input and output lines simultaneously driven.

7. The image forming apparatus according to claim 1, wherein the plurality of actuators are motors or solenoids.

8. An image forming apparatus comprising:

an image forming controller configured to control an operation of the apparatus;

a plurality of detectors configured to detect various conditions within the apparatus;

a plurality of drivers configured to drive a plurality of actuators; and an identification controller connected to the image forming controller by a single data line which transfers data from at least one of the plurality of detectors and to at least one of the plurality of drivers, the data being valid during a data validity period, identification signal line which transfers an identification signal, the identification signal being valid during the identification validity period, and period signal line which transfers a period signal that defines an input and output determination period, the identification validity period, and the data validity period, wherein the identification controller, determines whether during the input and output determination period a drive signal is output to one or more of the plurality of drivers, or whether a detection signal from one or more of the plurality of detectors is inputted, identifies a detector or driver from the plurality of detectors and the plurality of drivers from the identification signal, and specifies the data to be transferred to the data line in the data validity period as the data of the identified detector or driver, and wherein the identification controller comprises a drive pulse generating section that generates a drive pulse of the identified detector or driver.

* * * * *